Patented May 25, 1926.

1,586,115

UNITED STATES PATENT OFFICE.

GUSTAV PISTOR, OF GRIESHEIM-ON-THE-MAIN, AND ERNST BORSBACH, OF BITTER-FELD, GERMANY, ASSIGNORS TO THE FIRM: CHEMISCHE FABRIK GRIESHEIM ELEKTRON, OF GRIESHEIM-ON-THE-MAIN, GERMANY.

PRODUCTION OF PHOSPHORUS PRODUCTS.

No Drawing.   Application filed February 6, 1925. Serial No. 7,291.

Our invention relates to the production of phosphorus products and more especially pure phosphorus and its oxygen compounds. It is an object of our invention to provide means whereby pure phosphorus can be produced in a more efficient and more economical manner than has hitherto been possible. It is a further object of our invention to utilize this same method of producing phosphorus for the production therefrom of phosphorus pentoxide ($P_2O_5$) and eventually also phosphoric acid.

With these and other objects in view we shall now describe our invention and the preferred mode of carrying it out.

As is well known to those skilled in the art, phosphorus is produced from phosphates by heating same in the presence of carbon, preferably charcoal. In the modern production of phosphorus the electric arc is largely used for heating the mixture, sodium phosphate or the natural calcium phosphate (the latter frequently after treatment with sulphuric acid) being mixed with charcoal and sand and being placed in the electric furnace. The air of the furnace is first replaced by coal gas and the electric arc is then formed; a vigorous reaction takes place and the phosphorus vapors distil over and are collected in suitable receivers under water.

In the practice of this process it has been observed that the flying dust formed in the furnace from mechanical causes and under the action of the electric arc and being carried along by the gases and vapors escaping from the furnace, although not impeding the condensation, still causes a certain proportion of phosphorus to be combined by adsorption forming a sludge which influences the yield of pure phosphorus to a considerable extent. In order to prevent this sludge from creating serious trouble, it must be decomposed.

It has been tried to evade these difficulties by causing the gases and vapors carrying the dust to pass through condensing chambers of the type usually employed in the metallurgical industry, but the results were not satisfactory.

We have now ascertained that by causing the dust-laden gases and vapors to pass through chambers permanently kept at a temperature above the dew point of phosphorus and provided with means for condensing the dust by electricity, the formation of sludge in the condensing vessels can be prevented altogether. The chambers, besides taking up part of the heat stored in the gases and vapors escaping from the electric furnace, are preferably insulated so as to avoid as far as possible all losses of heat. The balance of heat still required in order to keep the temperature within these chambers above the dew point of phosphorus can be supplied by suitable heating appliances. The condensation of dust in gases or vapors by electricity is well known and so are a number of systems, including the one invented by Cottrell, and we therefore refrain from specifically describing these well known means.

By thus causing the gases and vapors from the electric furnace to pass through a chamber or chambers, wherein a temperature above the dew point of phosphorus is permanently maintained, and subjecting such gases and vapors therein to the dust condensing and precipitating action of suitable electric discharges, all the dust is caught and the gases and vapors enter the water in substantially pure condition. Hitherto up to about 30 per cent of the phosphorus contained in the raw material were lost owing to the collection of the flying dust in the condensing vessels, the exact proportion depending upon the character of the raw material employed and the amount of electric energy consumed in the reduction furnace. By the application of our new process all this phosphorus is saved and the yield of pure phosphorus is increased accordingly.

However, this is not the only advantage derived from our invention, for we are now enabled to replace the water-filled condensing vessels, in which the phosphorus is collected, by means whereby the phosphorus vapors, after having passed through the electric condensing chambers and having been freed from dust therein, are directly oxidized and converted into phosphorus pentoxide and eventually into phosphoric acid.

The means for effecting such oxidation are too well known to require any description. Any well known means therefore can be directly connected with the electric condensing chambers and we are thus enabled to change over from the production of pure phosphorus to the production of phosphorus pentoxide or phosphoric acid and vice versa by merely connecting with the electric condensing chambers either the water-filled phosphorus condensing vessels or the oxidizing apparatus spoken of above.

We wish it to be understood that we do not desire to be limited to the exact details, proportions and sequence of operations above described, for obvious modifications will occur to a person skilled in the art.

We claim:—

1. The method of treating phosphorus compounds which comprises subjecting phosphorus vapors laden with dust to the dust precipitating action of electricity at a temperature above the dew point of phosphorus.

2. The method of treating phosphorus compounds which comprises heating a mixture of a phosphorus oxygen compound and carbon by the electric arc and subjecting the mixture of phosphorus vapors and carbon monoxide gas laden with dust to the dust precipitating action of electric discharges at a temperature above the dew point of phosphorus.

3. The method of treating phosphorus compounds which comprises heating a mixture of a phosphorus oxygen compound and carbon by the electric arc and subjecting the mixture of phosphorus vapors and carbon monoxide gas laden with dust to the dust precipitating action of electric discharges at a temperature above the dew point of phosphorus and then oxydizing the phosphorus vapor so as to form phosphorus pentoxide.

In testimony whereof we affix our signatures.

GUSTAV PISTOR.
ERNST BORSBACH.